(12) United States Patent
Kil

(10) Patent No.: US 9,473,291 B2
(45) Date of Patent: Oct. 18, 2016

(54) APPARATUSES AND METHODS FOR REDUCING SWITCHING JITTER

(71) Applicant: Intel Corporation, Santa Clara, CA (US)

(72) Inventor: Jonggab Kil, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 14/325,837

(22) Filed: Jul. 8, 2014

(65) Prior Publication Data

US 2016/0013926 A1    Jan. 14, 2016

(51) Int. Cl.
| | |
|---|---|
| *H04J 3/06* | (2006.01) |
| *H04L 7/00* | (2006.01) |
| *H04L 25/14* | (2006.01) |
| *H04L 25/49* | (2006.01) |

(52) U.S. Cl.
CPC ............. *H04L 7/0041* (2013.01); *H04L 25/14* (2013.01); *H04L 25/49* (2013.01)

(58) Field of Classification Search
CPC ..... H04L 7/02; H04L 7/0012; H04L 1/0042; H04L 1/205; H04L 43/087; H04L 25/0264; H04L 25/03343; H04L 25/49; H04L 25/0272; H04L 25/14; G01R 31/31709; G01R 31/31901; G01R 31/31708; G06F 13/42; H04B 3/04; H04B 3/46; H04B 1/1081
See application file for complete search history.

(56) References Cited

U.S. PATENT DOCUMENTS

| | | | |
|---|---|---|---|
| 7,340,021 B1 * | 3/2008 | Churchill .............. | H04L 7/0338 375/326 |
| 9,148,198 B1 * | 9/2015 | Zhang ..................... | G06F 13/42 |
| 2005/0068082 A1 | 3/2005 | Nguyen et al. | |
| 2008/0028460 A1 | 1/2008 | Von Mueller et al. | |
| 2011/0316598 A1 | 12/2011 | Petrie | |
| 2014/0070862 A1 | 3/2014 | Palmer et al. | |
| 2014/0241465 A1 * | 8/2014 | Itoigawa ............. | H04L 25/0272 375/316 |
| 2015/0030112 A1 * | 1/2015 | Wiley ................. | H04L 25/0292 375/360 |
| 2015/0229467 A1 * | 8/2015 | Lee ......................... | H04L 25/14 375/371 |
| 2015/0271037 A1 * | 9/2015 | Wiley ................... | H04L 43/087 370/252 |

FOREIGN PATENT DOCUMENTS

JP    2012-217081 A    11/2012

OTHER PUBLICATIONS

International Search Report and Written Opinion mailed Aug. 28, 2015 for International Application No. PCT/US2015/030616, 11 pages.
Office Action mailed Aug. 25, 2016 for Taiwan Patent Application No. 104117771, 7 pages.

* cited by examiner

*Primary Examiner* — Charles C Jiang
*Assistant Examiner* — Rose Clark
(74) *Attorney, Agent, or Firm* — Schwabe, Williamson & Wyatt, P.C.

(57) ABSTRACT

Described are apparatuses and methods for reducing channel physical layer (C-PHY) switching jitter. An apparatus may include a pattern dependent delay circuit to detect a switching pattern of at least three data signals on respective wires and adaptively change delays of the at least three data signals based on the switching pattern. The apparatus may further include a transmitter, coupled to the pattern dependent delay circuit, to transmit the at least three data signals.

20 Claims, 7 Drawing Sheets

APPARATUSES AND METHODS FOR REDUCING SWITCHING JITTER

TECHNICAL FIELD

This disclosure relates generally to electronic circuits. More particularly but not exclusively, the present disclosure relates to apparatuses and methods for reducing switching jitter in data circuits.

BACKGROUND

Mobile Industry Processor Interface (MIPI) Alliance (MIPI®) channel physical layer (C-PHY) is a high-speed serial interface specification to provide high throughput performance over bandwidth limited channels for connecting to peripherals, including displays and cameras. C-PHY is based on 3-phase symbol encoding technology for delivering high bits per symbol (e.g., 2.28 bits per symbol) over a set of three wires. C-PHY may increase the data rate by encoding and decoding the data using three states of wires, e.g., low, mid, and high. C-PHY also may offer the advantage of jitter tracking. For example, only cycle-to-cycle jitter may affect the receiver since the clock is embedded in every cycle of data transaction. However, C-PHY exhibits the intrinsic jitter naturally associated with switching among different switching stages.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
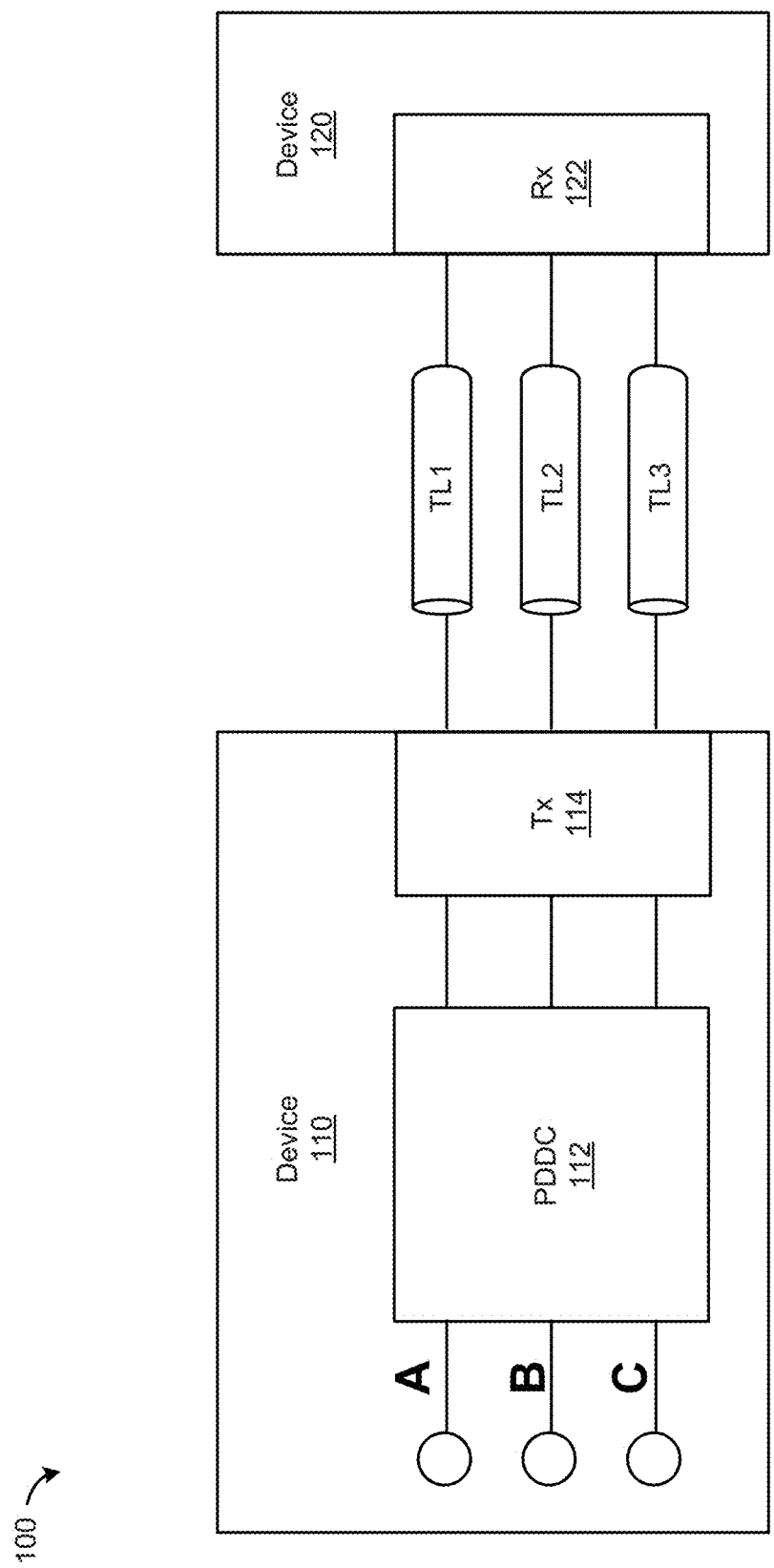
FIG. 1 is an example system architecture diagram for reducing switching jitter, incorporating aspects of the present disclosure, in accordance with various embodiments.

The embodiments describe apparatuses and methods for reducing switching jitter. In one embodiment, an apparatus may include a pattern dependent delay circuit to detect a switching pattern of at least three data signals on respective wires and adaptively change delays of the at least three data signals based on the detected switching pattern. The apparatus may further include a transmitter, coupled to the pattern dependent delay circuit, to transmit the at least three data signals. Other technical effects will be evident from various embodiments described here.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, or data/clock signal. The meaning of "a," "an," and "the" include plural references. The meaning of "in" includes "in" and "on."

The terms "substantially," "close," "approximately," "near," and "about" generally refer to being within +/−20% of a target value. The term "scaling" generally refers to converting a design (schematic and layout) from one process technology to another process technology. The term "scaling" generally also refers to downsizing layout and devices within the same technology node. The term "scaling" may also refer to adjusting (e.g., slowing down) a signal frequency relative to another parameter, for example, power supply level.

Unless otherwise specified, the use of the ordinal adjectives "first," "second," "third," etc., to describe a common object merely indicate that different instances of like objects are being referred to, and are not intended to imply that the objects so described must be in a given sequence, either temporally, spatially, in ranking, or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors, or other devices implementing transistor functionality, like carbon nano tubes or spintronic devices. Source and drain terminals may be identical terminals and are interchangeably used herein. Those skilled in the art will appreciate that other transistors, for example, bipolar junction transistors (BJT) may be used without departing from the scope of the disclosure. The term "MN"

indicates an n-type transistor (e.g., NMOS, NPN BJT, etc.), and the term "MP" indicates a p-type transistor (e.g., PMOS, PNP BJT, etc.).

FIG. 1 illustrates a computing system 100 for reducing switching jitter, incorporating aspects of the present disclosure, in accordance with various embodiments. In one embodiment, computing system 100 includes device 110 having transmitter (Tx) 114, device 120 having receiver (Rx) 122, and three transmission lines (TLs) TL1-TL3 forming a point-to-point lane interconnect between devices 110 and 120. In embodiments, device 110 may include pattern dependent delay circuit (PDDC) 112, which may receive three signals A, B, and C, and pass a delayed version of the three signals to the Tx 114. The delay provided by the PDDC 112 may depend on the detected switch pattern of the three signals.

In various embodiments, Tx 114 may transmit the three signals A, B, and C (e.g., the delayed version of the three signals A, B, and C as received from the PDDC 112) over the respective transmission lines TL1, TL2, and TL3 to Rx 122. The voltage levels on the three TLs (i.e., TL1, TL2, and TL3) at the input of Rx 122 are $V_A$, $V_B$, and $V_C$, respectively. Here, voltage levels $V_A$, $V_B$, and $V_C$ are also interchangeably referred to as signals A, B, and C, respectively.

In embodiments, computing system 100 may be compatible with the C-PHY specification, which defines a high-speed, rate-efficient PHY, suited for mobile applications where channel rate limitations are a factor. In embodiments, 3-phase symbol encoding technology may be used by devices 110 and 120 to deliver approximately 2.28 bits per symbol over the three-wire transmission lines TL1-TL3. In embodiments, Tx 114 and Rx 122 may communicate at a rate of about 2.5 giga-symbols per second. Although embodiments herein are described with reference to C-PHY signaling, it will be apparent that the embodiments may be used with any suitable communication protocol that employs three or more transmission lines and three or more logic states.

In some embodiments, device 110 may include a camera or a display, and device 120 may be a host mobile device. In embodiments, device 110 may be a master, and device 120 may be a slave in a synchronous connection between master and slave. Device 110 may provide the high-speed data signals and may be the main data source from which device 120 may receive the data signals (e.g., the main data sink).

The direction of data communication from device 110 to device 120 may be denoted as the forward direction. In some embodiments, the point-to-point lane interconnect between devices 110 and 120 may be a bi-directional lane. The point-to-point lane interconnect between devices 110 and 120 may provide a high-speed signaling mode for fast-data traffic, e.g., from device 110 to device 120. Further, the point-to-point lane interconnect between devices 110 and 120 may provide a low-power signaling mode for control purposes, e.g., sending control signals from device 120 to device 110. In some embodiments, the point-to-point lane interconnect between devices 110 and 120 may be a unidirectional lane, which only supports communication in the forward direction.

In embodiments, PDDC 112 may be used to reduce the intrinsic switch jitter associated with the three signals A, B, and C using a pattern dependent delay (PDD) line technique before sending the signals to Tx 114. In this way, the switching jitters at device 110 may be reduced; consequently, the eye margin may be improved at device 120.

Figure 2:
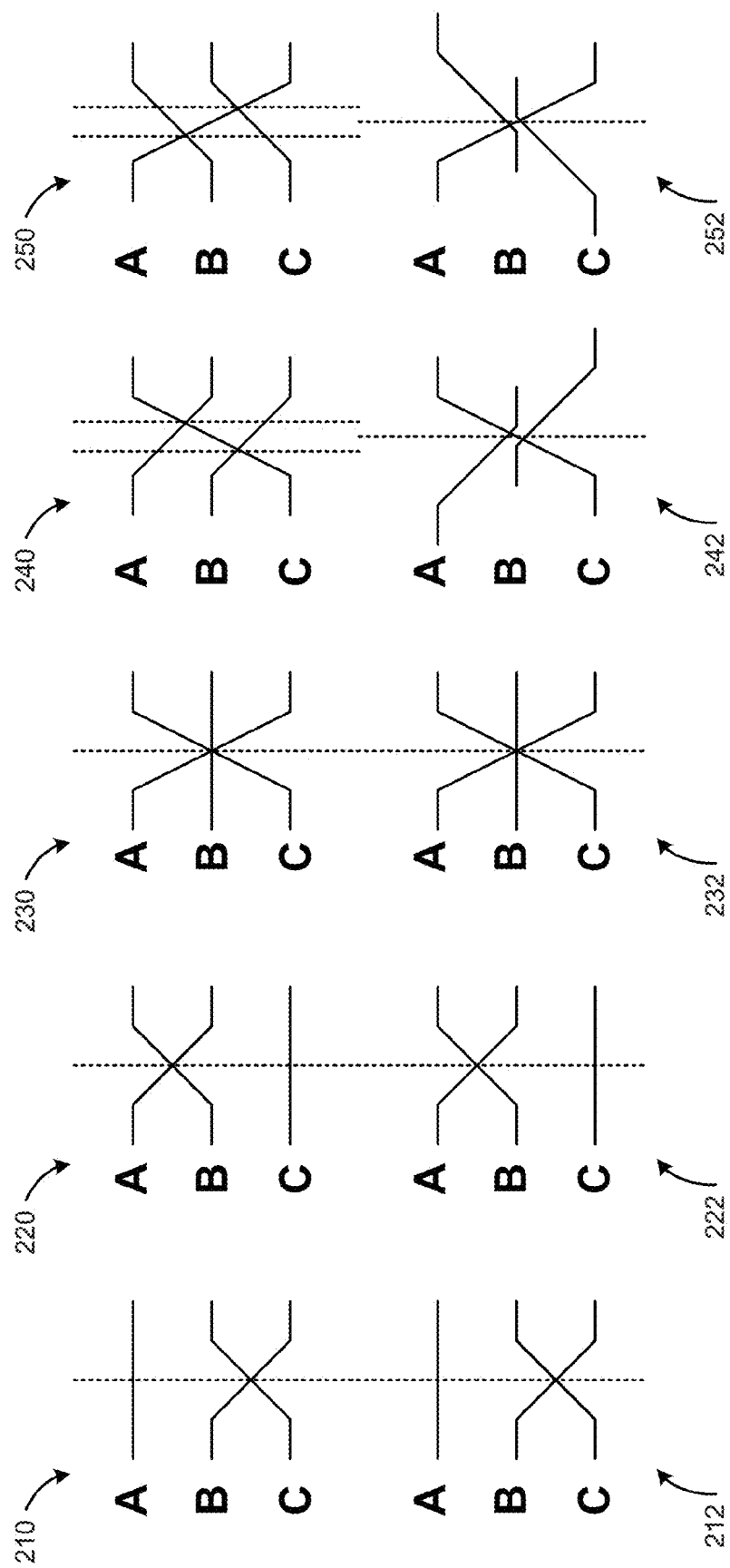
FIG. 2 is a schematic diagram of various switching patterns, incorporating aspects of the present disclosure, in accordance with various embodiments.

FIG. 2 is a schematic diagram illustrating switching patterns 210, 212, 220, 222, 230, 232, 240, 242, 250, and 252, incorporating aspects of the present disclosure, in accordance with various embodiments. Those elements of FIG. 2 having the same reference numbers (or names) as the elements of any other figure can operate or function in any manner similar to that described, but are not limited to such. So as not to obscure the embodiments, elements and features discussed previously may not be repeated.

In embodiments, data may be encoded and decoded using three states of the signals A, B, and C, e.g., low, mid, and high, that are driven on respective wires. For example, two of the three wires may be driven to opposite levels, and the third wire may be terminated to a mid-level. To simplify clock recovery, clock timing may be encoded into each symbol, which requires the combination of voltages driven onto the wires to be changed at every symbol.

When three wires each carry different voltages, there are six possible wire states wherein a wire state is the combination of signal levels driven on the three lines of a lane. During a high-speed unit interval (UI), one of the six possible wire states is driven onto a lane, and each of the three lines of the lane is driven to one of three signal levels, e.g., low, mid, and high. In embodiments, each of the three lines in a lane may be driven to a different signal level at a given time. Therefore, there may be six possible wire states with a different signal level on each of the three lines simultaneously. From any given wire state, there may be five possible transitions to the next wire state.

As illustrated in FIG. 2, in this embodiment, the starting wire state for signals A, B, and C is high, mid, and low, respectively. For example, voltages on signals A, B, and C may be ¾ V, ½ V, and ¼ V, respectively, wherein V may represent a unit of voltage. In each unit interval (UI), voltages of signals A, B, and C may toggle between ¾ V, ½ V, and ¼ V.

Without using PDDC 112 in connection with FIG. 1, the five possible transitions to the next wire state are illustrated by patterns 210, 220, 230, 240, and 250 in FIG. 2. In pattern 210, the next wire state becomes high, low, and mid for A, B, and C, respectively. In pattern 220, the next wire state becomes mid, high, and low for A, B, and C, respectively. In pattern 230, the next wire state becomes low, mid, and high for A, B, and C, respectively. In pattern 240, the next wire state becomes mid, low, and high for A, B, and C, respectively. In pattern 250, the next wire state becomes low, high, and mid for A, B, and C, respectively.

In various embodiments, patterns 212, 222, 232, 242, and 252 illustrate the five possible transitions to the next wire state when the PDDC 112 is used. As can be seen, patterns 210, 220, and 230 are not associated with intrinsic switching jitters. Therefore, signals A, B, and C may pass through PDDC 112 in connection with FIG. 1 without introducing any delay for any signal. The patterns of 212, 222, and 232 thus remain substantially the same as the patterns of 210, 220, and 230, respectively, after passing through PDDC 112 in connection with FIG. 1.

However, patterns 240 and 250 come with intrinsic switching jitters as shown. For example, in respect of pattern 240, the misalignment of AB, BC and CA switching will naturally introduce switching uncertainty of AB, BC and CA. If the driver driving the signals has a slower slew rate, switching jitters may even get amplified. In embodiments, PDDC 112 may introduce pattern dependent delays to signals A, B, and C to reduce switching jitters. In the case of pattern 240, a short delay may be introduced to signal A, a medium delay may be introduced to signal B, and a long delay may be introduced to signal C. In the case of pattern 250, appropriate delays with increased length may be introduced to signals C, A, and B so that the switching jitter may be reduced. As shown, after introducing appropriate delays for signals A, B, and C by PDDC 112, the switching patterns 242 and 252 have substantially reduced their respective switching jitter.

In other embodiments, the starting wire states for signals A, B, and C may differ from what are shown in FIG. 2, but switching jitters may still be present in some switching patterns, e.g., when each signal switches to a different voltage level from its prior voltage level. Specifically, signals A, B, and C may switch from (high, low, mid) to (mid, high, low), from (high, low, mid) to (low, mid, high), from (mid, low, high) to (high, mid, low), from (mid, low, high) to (low, high, mid), from (mid, high, low) to (high, low, mid), from (mid, high, low) to (low, mid, high), from (low, high, mid) to (high, mid, low), from (low, high, mid) to (mid, low, high), from (low, mid, high) to (high, low, mid), or from (low, mid, high) to (mid, high, low). In these cases, switching jitters may be reduced after applying pattern dependent delays, e.g., by PDDC 112 in connection with FIG. 1. Enhanced with the teaching in this disclosure, switching jitters may be reduced before transmitting the data to a lane (e.g., TL1-TL3), and the eye margin may be further opened for the receiver.

Figure 3:
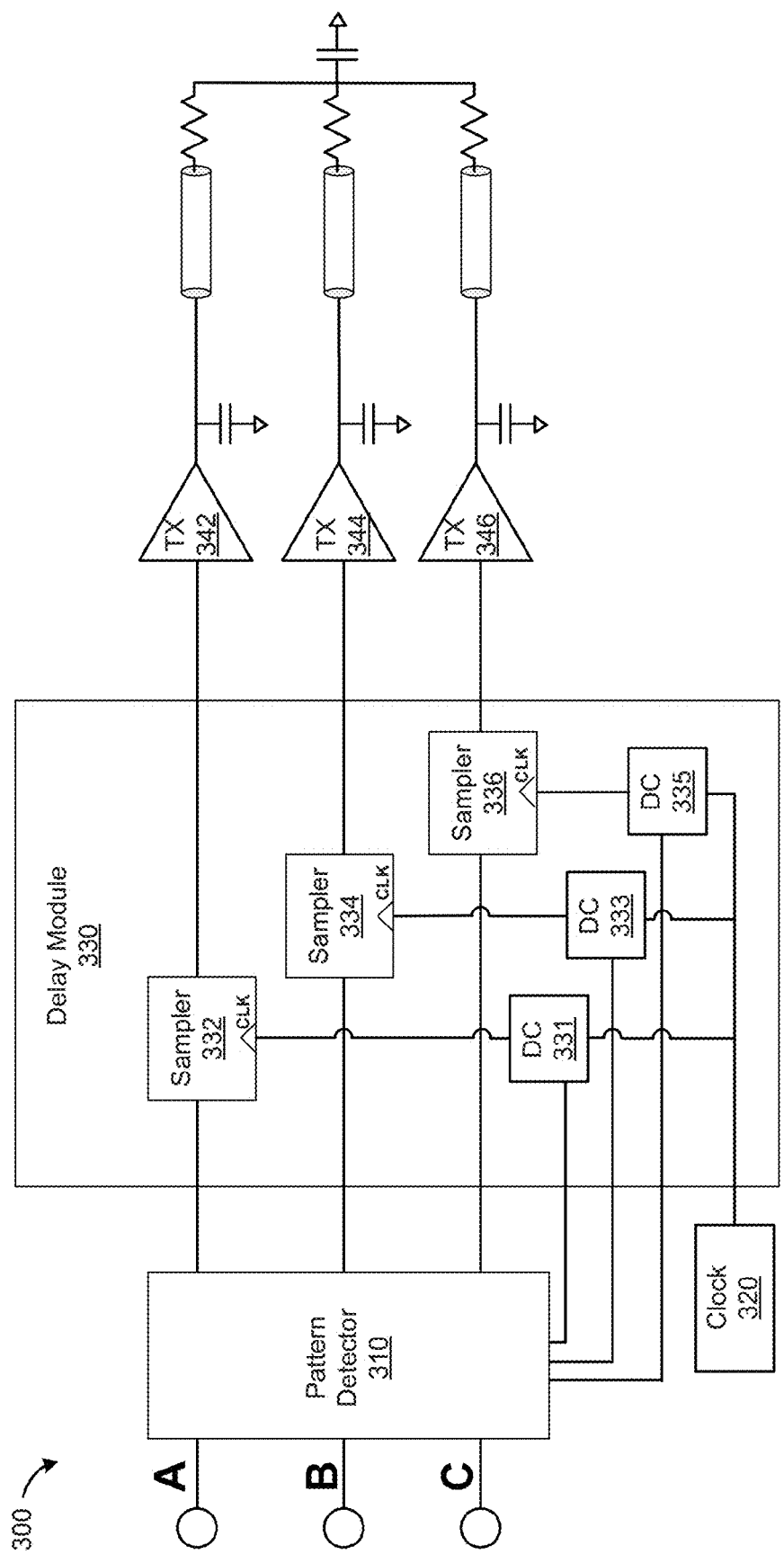
FIG. 3 is a schematic diagram of an example device for reducing switching jitter, incorporating aspects of the present disclosure, in accordance with various embodiments.

FIG. 3 is a schematic diagram of an example device for reducing C-PHY switching jitter, incorporating aspects of the present disclosure, in accordance with various embodiments. Those elements of FIG. 3 having the same reference numbers (or names) as the elements of any other figure can operate or function in any manner similar to that described, but are not limited to such. So as not to obscure the embodiments, elements and features discussed previously may not be repeated.

In embodiments, pattern dependent delay circuit (PDDC) 300 may include pattern detector 310 to detect the switching pattern associated with signals A, B, and C. Pattern detector 310 may detect the logic state associated with each of signals A, B, or C. As an example, logic states of high, mid, and low may be associated with voltages of ¾ V, ½ V, and ¼ V, respectively, wherein V may represent a unit of voltage. In embodiments, signals A, B, or C each may have at least three different logic states, such as high, mid, and low. A signal may switch from one logic state to another.

Pattern detector 310 may detect a switching pattern of at least three data signals on respective wires. In some embodiments, pattern detector 310 may have memory of the prior logic state on respective wires and knowledge of the current logic state. Thus, pattern detector 310 may detect the switching pattern based on the prior logic state and the current logic state of the data signals. As an example, in connection with FIG. 2, pattern detector 310 may detect pattern 240 based on the prior logic state (high, mid, low) and the current logic state (mid, low, high) of signals A, B, and C.

PDDC 300 may also include delay module 330 to change the delays of signals A, B, and C based on the detected switching pattern. In some embodiments, pattern detector 310 may send one or more control signals to delay module 330 for changing the delays of signals A, B, and C when pattern detector 310 detects that the signals each are undergoing a state transition during a same time period. As an example, in connection with FIG. 2, pattern detector 310 may detect that each signal in pattern 250 is undergoing a state transition, e.g., signal A switches from high to low, signal B switches from mid to high, and signal C switches from low to mid. In this case, the control signals may actuate delay module 330 to cause different delays for each of the signals.

In embodiments, delay module 330 may include a number of delay controllers (DC), such as DCs 331, 333, and 335. The delay module may also include a number of samplers, such as samplers 332, 334, and 336, which are coupled to DCs 331, 333, and 335, respectively. In embodiments, the DCs 331, 333, and 335 may be paired with respective samplers 332, 334, or 336 to cause delay on a respective wire. As an example, DC 331 may receive a common clock signal from clock 320, and add a delay to the clock signal, e.g., based on the control signal received from pattern detector 310. Subsequently, the delayed clock signal may control sampler 332 to sample data later in time, thus adding delay on signal A.

In embodiments, PDDC 300 may adaptively change the delays of signals A, B, and C based on the detected switching pattern. In embodiments, PDDC 300 may reduce switching jitters associated with some switching pattern, such as pattern 240 or 250 in connection with FIG. 2. In embodiments, data signals with reduced switching jitters may be further sent by transmitters, such as Tx 342, Tx 344, or Tx 346, to a receiver. In embodiments, PDDC 300 may be used to reduce C-PHY switching jitters. In those cases, Tx 342, Tx 344, and Tx 346 may be MIPI C-PHY compliant transmitters.

Figure 4:
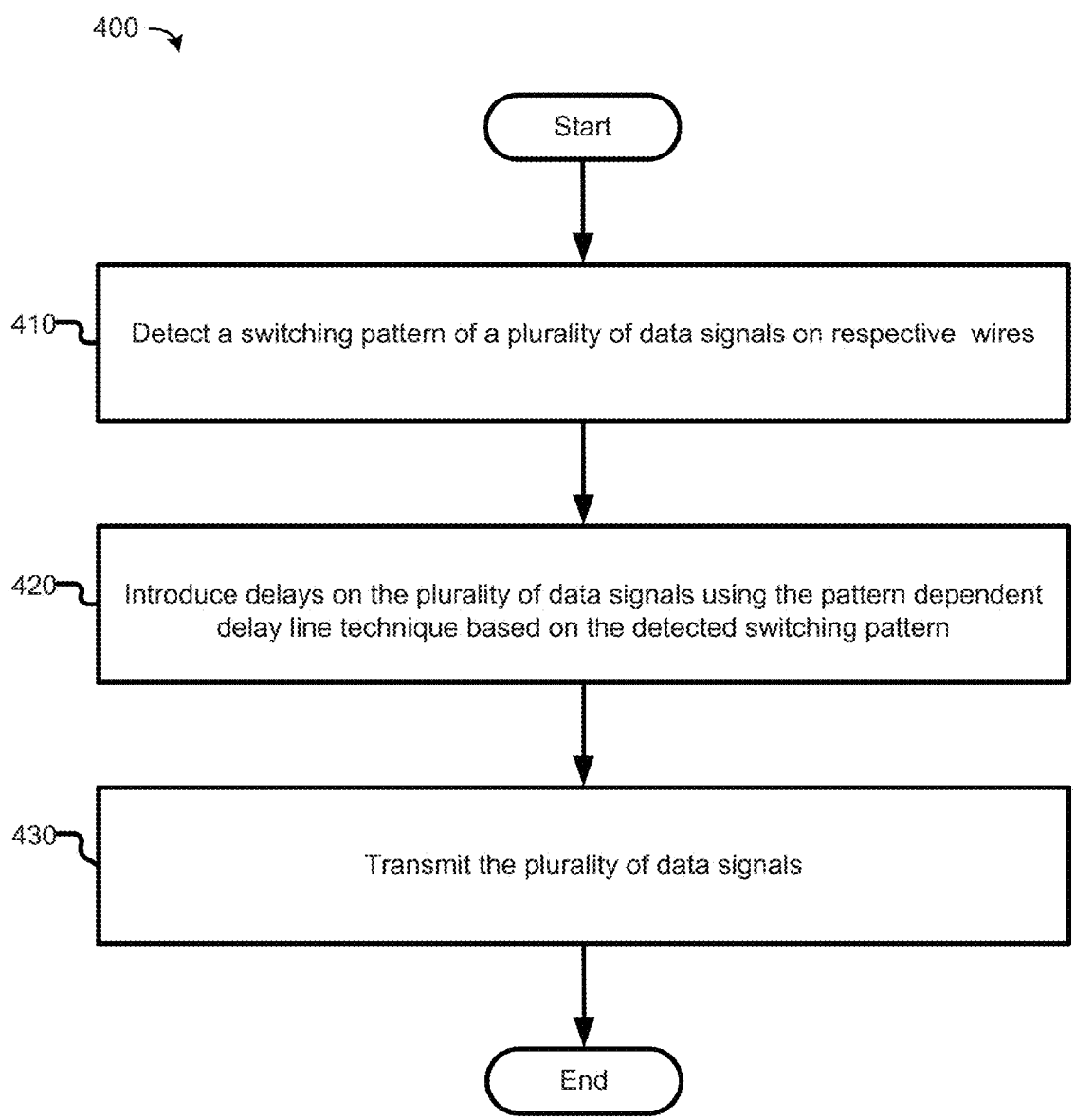
FIG. 4 is a flow diagram of an example switching jitter reduction process executable by an example apparatus incorporating aspects of the present disclosure, in accordance with various embodiments.

FIG. 4 is a flow diagram of an example C-PHY switching jitter reduction process executable by an example apparatus incorporating aspects of the present disclosure, in accordance with various embodiments. As shown, process 400 may be performed by a device with any one structure disclosed in FIG. 1 or 3 to implement one or more embodiments of the present disclosure.

In embodiments, at block 410 of the process 400, a switching pattern of a plurality of data signals on respective wires may be detected, e.g., by pattern detector 310. In embodiments, a data signal may have at least three logic states, such as expressed in at least three different voltage levels. Accordingly, the logic state of the data signal may be detected based on the voltage level. In embodiments, a switching pattern based on a prior logic state and a current logic state of the plurality of data signals may be detected, for example, as described in connection with FIG. 2.

Next, at block 420, delays on one or more of the plurality of data signals may be introduced using the pattern dependent delay line technique based on the detected switching pattern, e.g., by delay module 330. In some embodiments, the detected switching pattern may include each data signal switching to a different logic state from its prior logic state. In this case, appropriate delays may be introduced to the data signals based on the detected switching pattern to reduce switching jitters. As an example, different delay lengths may be introduced to different signals. Resultantly, the switching timing for the plurality of data signals may be adjusted based on the delays so that the switching jitter may be reduced.

Next, at block 430, the plurality of data signals may be transmitted, e.g., by Tx 342, Tx 344, and Tx 346. In this way, the switching jitters at the sender may be reduced; consequently, the eye margin may be improved at the receiver side.

Figure 5:
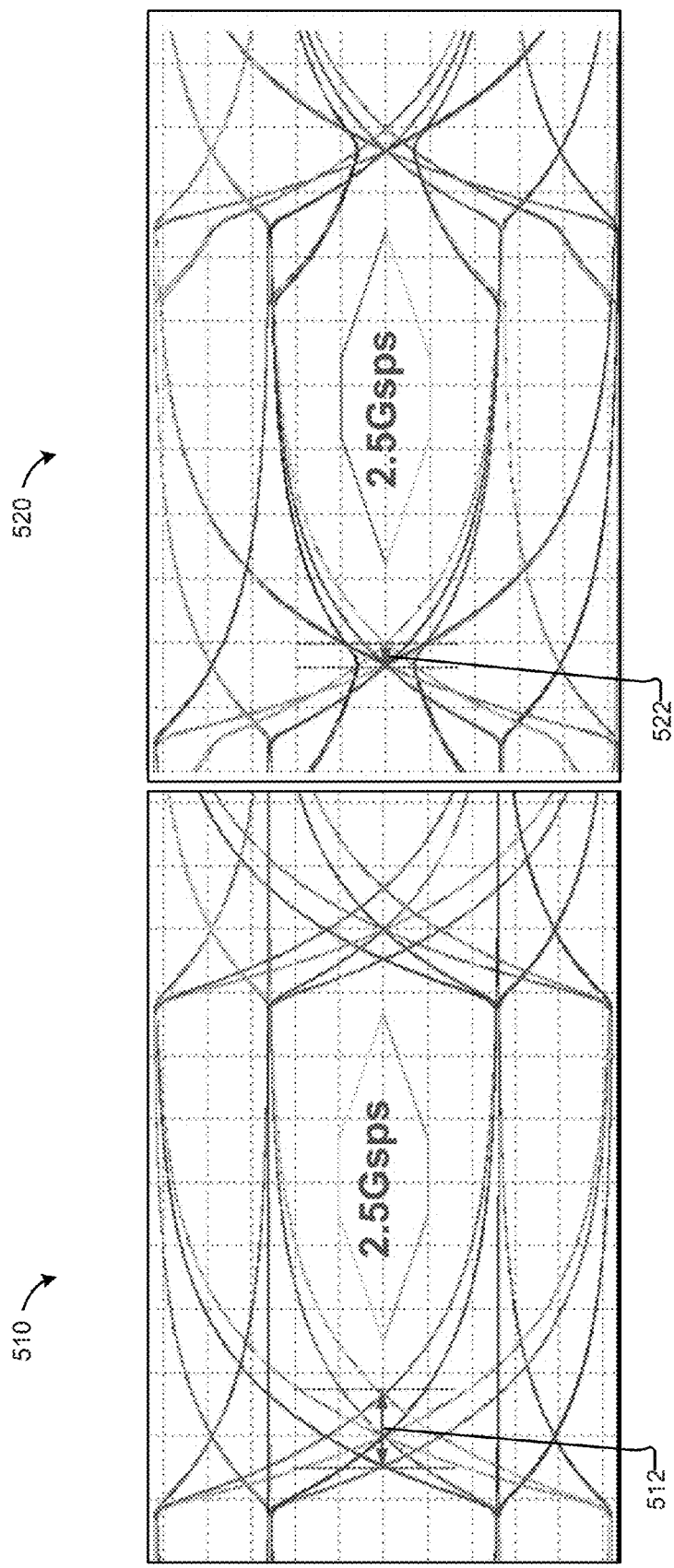
FIG. 5 is a set of plots showing example waveforms associated with switching jitter reduction at the transmitter, incorporating aspects of the present disclosure, in accordance with various embodiments.

FIG. 5 is a set of plots showing example waveforms associated with C-PHY switching jitter reduction at the transmitter, incorporating aspects of the present disclosure, in accordance with various embodiments. Plot 510 shows example waveforms measured at a transmitter without applying pattern dependent delays, while plot 520 shows example waveforms measured at the transmitter after applying pattern dependent delays.

In this embodiment, a total pad capacitance (Cpad) of about 3 pico farad (pf) and an operating frequency of 2.5 gigasample-per-second (Gsps) are used to analyze eye margin. In this case, the channel margin is about 0.2 unit interval (UI) (e.g., about 80 picoseconds (ps)), and the transmitter timing budget is about 0.3 UI (e.g., about 120 ps). As shown, more than 0.15 UI of total margin is wasted due to intrinsic switching jitter 512 in plot 510. On the other side, switching jitter 522 in plot 520 is minimized after applying pattern dependent delays in the transmitter.

Figure 6:
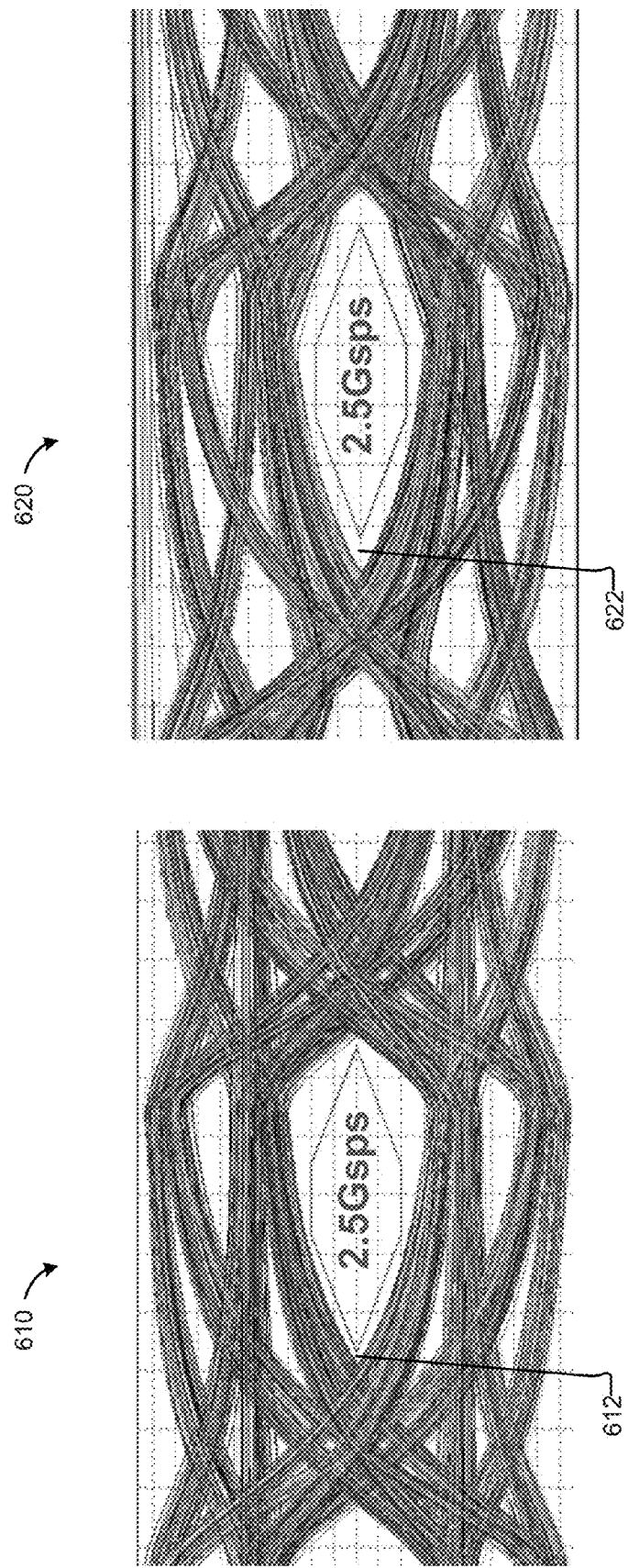
FIG. 6 is a set of plots showing example waveforms associated with switching jitter reduction at the channel, incorporating aspects of the present disclosure, in accordance with various embodiments.

FIG. 6 is a set of plots showing example waveforms associated with C-PHY switching jitter reduction at the channel, incorporating aspects of the present disclosure, in accordance with various embodiments. In embodiments, plots 610 and 620 show waveforms measured for C-PHY signaling arrived at the receiver through a lossy channel. The basic unit of channel for C-PHY includes a set of three wires.

Plot 610 shows example waveforms measured at a channel without applying pattern dependent delays, while plot 620 shows example waveforms measured at the channel after applying pattern dependent delays. Thus, plot 610 is the baseline reads without PDD, while plot 620 incorporates aspects of the present disclosure for switching jitter reduction. In this embodiment, the differential channel loss used for plots 610 and 620 is about −2.4 decibel (dB).

In embodiments, intrinsic switching jitters may be naturally amplified through the channel, and eye margin may be degraded significantly since the channel loss is operated as a low pass filter. Therefore, plot 610 shows a degraded eye margin 612. If the switching timing for some known patterns as discussed above are adjusted based on PDD, switching jitters from the transmitter may be minimized so that eye margin may be improved dramatically at the receiver. Hence, plot 620 shows the platform margin improvement with PDD, indicated by the improved eye margin 622.

Figure 7:
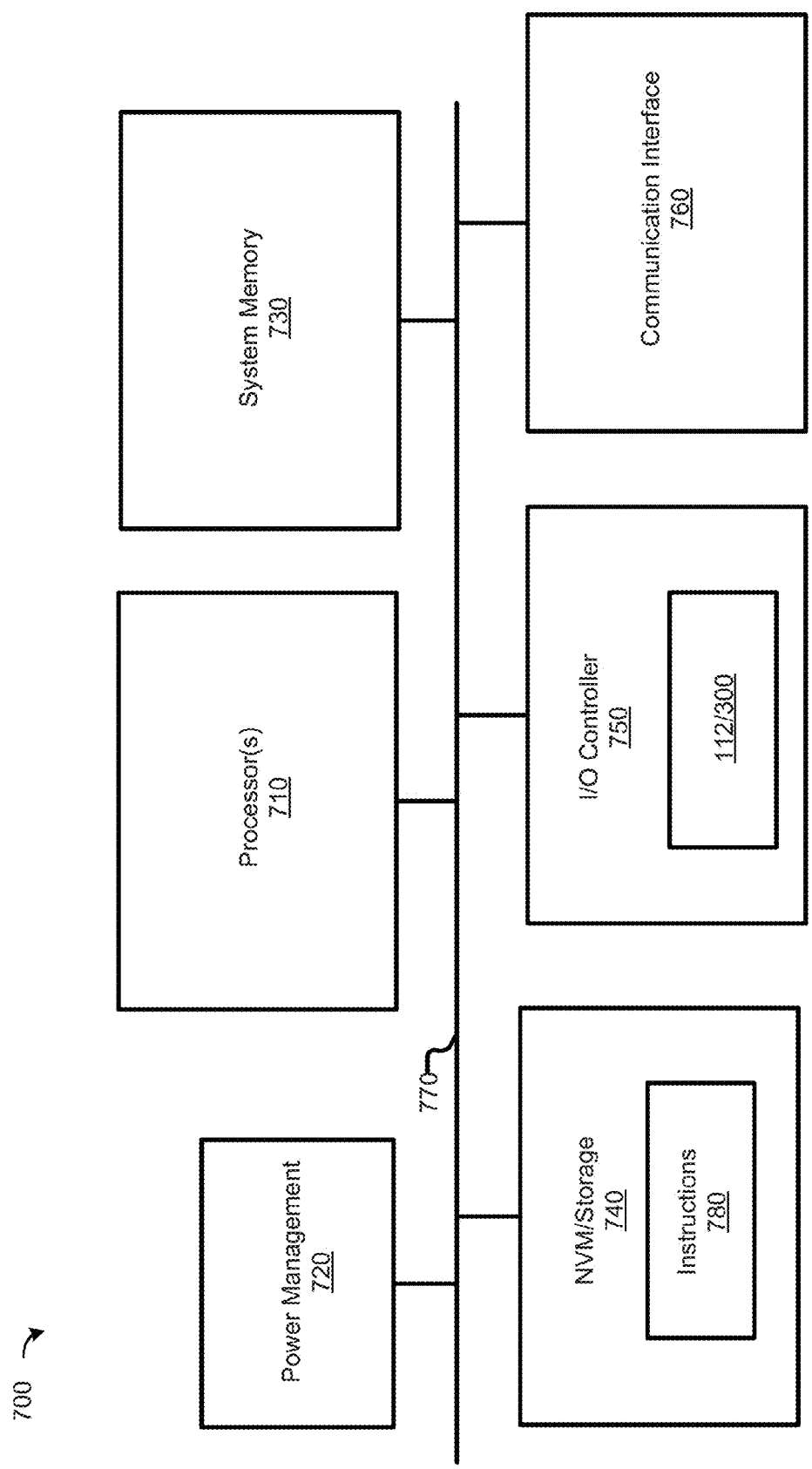
FIG. 7 is a block diagram that illustrates an example computer device suitable for practicing the disclosed embodiments, in accordance with various embodiments.

FIG. 7 is a block diagram that illustrates an example computer system 700 suitable for practicing the disclosed embodiments with any of the design principles described with reference to FIGS. 1-6, in accordance with various embodiments. In one embodiment, computing system 700 represents a mobile computing device, such as a computing tablet, a mobile phone or smartphone, a wireless-enabled e-reader, or another wireless mobile device. It will be understood that certain components are shown generally, and not all components of such a device are shown in computing system 700.

As shown, computer system 700 may include a power management 720; a number of processors or processor cores 710; a system memory 730; a non-volatile memory (NVM)/storage 740 having processor-readable and processor-executable instructions 780 stored therein; an I/O controller 750 having at least one structure for reducing switching jitter, like circuit 300 or PDDC 112; and a communication interface 760. For the purpose of this application, including the claims, the terms "processor" and "processor cores" may be considered synonymous, unless the context clearly requires otherwise. Those elements of FIG. 7 having the same reference numbers (or names) as the elements of any other figure can operate or function in any manner similar to that described, but are not limited to such.

In one embodiment, processors 710 may include one or more physical devices, such as microprocessors, application processors, microcontrollers, programmable logic devices, or other processing means. The processing operations performed by processors 710 may include the execution of an operating platform or operating system on which applications and/or device functions are executed. The processing operations may include operations related to input/output (I/O) with a human user or with other devices, operations related to power management, and/or operations related to connecting the computing system 700 to another device. The processing operations may also include operations related to audio I/O and/or display I/O.

The one or more NVM/storage 740 and/or the system memory 730 may comprise a tangible, non-transitory computer-readable storage device (such as a diskette, hard drive, compact disc read only memory (CD-ROM), hardware storage unit, flash memory, phase change memory (PCM), solid-state drive (SSD) memory, and so forth). Instructions 780 stored in the NVM/storage 740 and/or the system memory 730 may be executable by one or more of the processors 710. Instructions 780 may contain particular instructions to enable or disable the switching jitter reduction operations as illustrated in connection with FIG. 4.

Computer system 700 may also include input/output devices (not shown) coupled to computer system 700 via I/O controller 750. I/O controller 750 illustrates a connection point for additional devices that connect to computing system 700 through which a user might interact with the system. For example, various devices that may be coupled to the computer system 700 via I/O controller 750 may include microphone devices, speaker or stereo systems, video systems or other display devices, keyboard or keypad devices, or other I/O devices for use with specific applications such as card readers or other devices. In various embodiments, I/O controller 750 may include a high-speed serial interface compatible with the C-PHY specification, which may provide high throughput performance over bandwidth limited channels for connecting to peripherals, including displays and cameras. In those embodiments, I/O controller 750 may include circuits like PDDC 112 in connection with FIG. 1 or circuit 300 in connection with FIG. 3. Therefore, C-PHY intrinsic switching jitter may be reduced using pattern dependent delay line techniques as discussed in this disclosure.

In embodiments, communication interface 760 may provide an interface for computing system 700 to communicate over one or more network(s) and/or with any other suitable device. Communication interface 760 may include any suitable hardware and/or firmware, such as a network adapter, one or more antennas, wireless interface(s), and so forth. In various embodiments, communication interface 760 may include an interface for computing system 700 to use near field communication (NFC), optical communications, or other similar technologies to communicate directly (e.g., without an intermediary) with another device. In various embodiments, communication interface 760 may interoperate with radio communications technologies such as, for example, Wideband Code Division Multiple Access (WCDMA), Global System for Mobile Communications (GSM), Long Term Evolution (LTE), WiFi, Bluetooth®, Zigbee, and the like.

The various elements of FIG. 7 may be coupled to each other via a system bus 770, which represents one or more buses. In the case of multiple buses, they may be bridged by one or more bus bridges (not shown). Data may pass through the system bus 770 through the I/O controller 750, for example, between an output terminal and the processors 710.

System memory 730 and NVM/storage 740 may be employed to store a working copy and a permanent copy of the programming instructions implementing one or more operating systems, firmware modules or drivers, applications, and so forth, herein collectively denoted as instructions 780. In embodiments, instructions 780 may include logic for reducing C-PHY switching jitters using pattern dependent delay line techniques described in this disclosure. The permanent copy of the programming instructions may be placed into permanent storage in the factory, or in the field, via, for example, a distribution medium (not shown), such as a compact disc (CD), or through the communication interface 760 (from a distribution server (not shown)).

In some embodiments, at least one of the processor(s) 710 may be packaged together with I/O controller 750. In some embodiments, at least one of the processor(s) 710 may be packaged together with I/O controller 750 having structures 112/300 to form a System in Package (SiP). In some embodiments, at least one of the processor(s) 710 may be integrated on the same die with I/O controller 750 having structures 112/300. In some embodiments, at least one of the processor(s) 710 may be integrated on the same die with I/O controller 750 having structures 112/300 to form a System on Chip (SoC).

According to various embodiments, one or more of the depicted components of the system 700 and/or other element(s) may include a keyboard, LCD screen, non-volatile memory port, multiple antennas, graphics processor, application processor, speakers, or other associated mobile device elements, including a camera. The remaining constitution of the various elements of the computer system 700 is known, and accordingly will not be further described in detail.

The above description of illustrated embodiments, including what is described in the Abstract, is not intended to be exhaustive or to be limited to the precise forms disclosed. While specific embodiments and examples are described herein for illustrative purposes, various modifications are possible. For example, the configuration and connection of certain elements in various embodiments that have been described above may be modified without departing from the teachings in connection with FIGS. 1-7. These and other modifications can be made in light of the above detailed description. The terms used in the following claims should not be construed to be limited to the specific embodiments disclosed in the specification.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is always only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications, and variations of such embodiments will be apparent to those of ordinary skill in the art in light of the foregoing description. For example, other memory architectures, e.g., dynamic random-access memory (DRAM), may use the embodiments discussed. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to the implementation of such block diagram arrangements are highly dependent upon the platform within which the present disclosure is to be implemented (i.e., such specifics should be well within the purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is an apparatus for reducing switching jitter, which may include a pattern dependent delay circuit. The pattern dependent delay circuit may further include a pattern detector to detect a switching pattern of at least three data signals on respective wires; and a delay module coupled to the pattern detector to adaptively change delays of the at least three data signals based on the detected switching pattern. Further, the apparatus may include a transmitter, coupled to the pattern dependent delay circuit, to transmit the at least three data signals.

Example 2 may include the subject matter of Example 1, and may further specify that individual data signals of the at least three data signals switch between at least three logic states.

Example 3 may include the subject matter of Example 2, and may further specify that the at least three data signals are in different logic states.

Example 4 may include any subject matter of Examples 1-3, and may further specify the pattern detector is to detect the switching pattern based on a prior logic state and a current logic state of the at least three data signals.

Example 5 may include any subject matter of Examples 1-4, and may further specify that the pattern detector is to send one or more control signals to the delay module to change the delays of the at least three data signals when the pattern detector detects that the at least three data signals are each undergoing a state transition during a same time period.

Example 6 may include any subject matter of Examples 1-5, and may further specify that the delay module is to cause different delays for each of the at least three data signals.

Example 7 may include any subject matter of Examples 1-6, and may further specify that the delay module includes a plurality of delay controllers and a plurality of samplers, wherein individual delay controllers are paired with individual samplers to cause delay of respective individual data signals of the at least three data signals.

Example 8 may include any subject matter of Examples 1-7, and may further specify that the pattern dependent delay circuit is to adaptively change the delays of the at least three data signals before the transmitter transmits the at least three data signals to reduce a switching jitter associated with the at least three data signals.

Example 9 may include any subject matter of Examples 1-8, and may further specify that the pattern dependent delay circuit is to reduce a C-PHY switching jitter.

Example 10 may include any subject matter of Examples 1-9, and may further specify that the transmitter is a mobile industry processor interface (MIPI) C-PHY compliant transmitter.

Example 11 is a system for reducing switching jitter, which may include a processor and a controller coupled to the processor to output data processed by the processor. The system may further include a transmitter coupled to the controller to transmit the data using at least three data signals, wherein individual data signals of the at least three data signals switch between at least three logic states; and a pattern dependent delay circuit, coupled to the transmitter, to detect a switching pattern of the at least three data signals and adaptively reduce a switching jitter based on the detected switching pattern.

Example 12 may include the subject matter of Example 11, and may further specify that the pattern dependent delay circuit is to reduce a C-PHY switching jitter by changing delays on the at least three data signals before the transmitter transmits the at least three data signals.

Example 13 may include the subject matter of Example 11 or 12, and may further specify that the transmitter is a MIPI® C-PHY compliant transmitter.

Example 14 is a method for reducing switching jitter, which may include detecting a switching pattern of a plurality of data signals on respective wires; causing a delay on one or more of the plurality of data signals based on the detected switching pattern; and transmitting the plurality of data signals.

Example 15 may include the subject matter of Example 14, and may further specify that the detecting comprises detecting a logic state of individual data signals of the plurality of data signals, wherein the logic state is one of at least three possible logic states.

Example 16 may include the subject matter of Example 14 or 15, and may further specify that the detecting comprises detecting the switching pattern based on a prior logic state and a current logic state of the plurality of data signals.

Example 17 may include any subject matter of Examples 14-16, and may further specify that the causing the delay is responsive to a detection that each of the plurality of data signals switches to a different logic state from a prior logic state.

Example 18 may include any subject matter of Examples 14-17, and may further specify that the causing comprises changing delays on each of the plurality of data signals based on the switching pattern Example 19 may include any subject matter of Examples 14-18, and may further specify that the causing comprises causing different delays on each of the plurality of data signals based on the switching pattern.

Example 20 may include any subject matter of Examples 14-19, and may further specify that the causing comprises reducing a C-PHY switching jitter.

Example 21 may include the subject matter of Example 20, and may further specify that the causing comprises reducing the C-PHY switching jitter by adjusting a switching timing for the plurality of data signals based on the delay.

Example 22 may include any subject matter of Examples 14-21, and may further specify that the transmitting comprises transmitting the plurality of data signals compliant with MIPI® C-PHY.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus, comprising:
    a pattern dependent delay circuit including:
        a pattern detector to detect a switching pattern of at least three data signals on respective wires, wherein individual data signals of the at least three data signals switch between at least three logic states; and
        a delay module coupled to the pattern detector to adaptively change delays of the at least three data signals based on the detected switching pattern, wherein the delay module comprises a plurality of delay controllers and a plurality of samplers, wherein individual delay controllers are paired with individual samplers to receive a clock signal and add a delay to the clock signal to cause delay of respective individual data signals of the at least three data signals; and
    a transmitter, coupled to the pattern dependent delay circuit, to transmit the at least three data signals, wherein the transmitter is a channel physical layer (C-PHY) transmitter.

2. The apparatus of claim 1, wherein the at least three data signals are in different logic states.

3. The apparatus of claim 1, wherein the pattern detector is to detect the switching pattern based on a prior logic state and a current logic state of the at least three data signals.

4. The apparatus of claim 1, wherein the pattern detector is to send one or more control signals to the delay module to change the delays of the at least three data signals when the pattern detector detects that the at least three data signals are each undergoing a state transition during a same time period.

5. The apparatus of claim 1, wherein the delay module is to cause different delays for each of the at least three data signals.

6. The apparatus of claim 1, wherein the pattern dependent delay circuit is to adaptively change the delays of the at least three data signals before the transmitter transmits the at least three data signals to reduce a switching jitter associated with the at least three data signals.

7. The apparatus of claim 1, wherein the pattern dependent delay circuit is to reduce a C-PHY switching jitter.

8. A system, comprising:
    a processor;
    a controller coupled to the processor to output data processed by the processor;
    a transmitter coupled to the controller to transmit the data using at least three data signals, wherein individual data signals of the at least three data signals switch between at least three logic states; and
    a pattern dependent delay circuit, coupled to the transmitter, to detect a switching pattern of the at least three data signals and adaptively reduce a switching jitter based on the detected switching pattern, wherein the pattern dependent delay circuit includes a plurality of delay controllers and a plurality of samplers, wherein individual delay controllers are paired with individual samplers to receive a clock signal and add a delay to the clock signal to cause delay of respective individual data signals of the at least three data signals, and wherein at least one of the samplers has an operating frequency of at least 2.5 giga-samples per second (Gsps).

9. The system of claim 8, wherein the pattern dependent delay circuit is to reduce a channel physical layer (C-PHY) switching jitter by changing delays on the at least three data signals before the transmitter transmits the at least three data signals.

10. The system of claim 8, wherein the transmitter is a physical layer transmitter to deliver at least 2.28 bits per symbol over a set of three wires using 3-phase encoding.

11. A method, comprising:
  detecting, by a pattern dependent delay circuit, a switching pattern of at least three data signals on respective wires, wherein individual data signals of the at least three data signals switch between at least three logic states;
  causing, by the pattern dependent delay circuit, a delay on one or more of the at least three data signals based on the detected switching pattern, wherein the causing the delay includes receiving, by a delay controller and a sampler of the pattern dependent delay circuit, a clock signal and adding a delay to the clock signal to cause delay of a respective data signal of the three or more data signals, wherein the sampler has an operating frequency of at least 2.5 giga-samples per second (Gsps); and
  transmitting the at least three data signals including the delay on the one or more of the at least three data signals.

12. The method of claim 11, wherein the detecting comprises detecting a logic state of individual data signals of the at least three data signals, wherein the logic state is one of the at least three logic states.

13. The method of claim 11, wherein the detecting comprises detecting the switching pattern based on a prior logic state and a current logic state of the at least three data signals.

14. The method of claim 11, wherein the causing the delay is responsive to a detection that each of the at least three data signals switches to a different logic state from a prior logic state.

15. The method of claim 11, wherein the causing comprises changing delays on each of the at least three data signals based on the switching pattern.

16. The method of claim 11, wherein the causing comprises causing different delays on each of the at least three data signals based on the switching pattern.

17. The method of claim 11, wherein the causing comprises reducing a channel physical layer (C-PHY) switching jitter.

18. The method of claim 17, wherein the causing comprises reducing the channel physical layer (C-PHY) switching jitter by adjusting a switching timing for the at least three data signals based on the delay.

19. The method of claim 11, wherein the transmitting comprises transmitting the at least three data signals to a peripheral device using 3-phase symbol encoding over a set of 3 wires.

20. An apparatus, comprising:
  a pattern dependent delay circuit including:
    a pattern detector to detect a switching pattern of at least three data signals on respective wires, wherein individual data signals of the at least three data signals switch between at least three logic states; and
    a delay module coupled to the pattern detector to adaptively change delays of the at least three data signals based on the detected switching pattern, wherein the delay module comprises a plurality of delay controllers and a plurality of samplers, wherein individual delay controllers are paired with individual samplers to receive a clock signal and add a delay to the clock signal to cause delay of respective individual data signals of the at least three data signals, and wherein at least one of the samplers has an operating frequency of at least 2.5 giga-samples per second (Gsps); and
  a transmitter, coupled to the pattern dependent delay circuit, to transmit the at least three data signals.

* * * * *